Aug. 7, 1962  R. H. OLSON  3,047,982
METHOD OF CONTROLLING THE WALL THICKNESS
OF BLOWN GLASS ARTICLES
Filed Aug. 7, 1958

INVENTOR.
RALPH H. OLSON
BY
ATTORNEYS 3,047,982
METHOD OF CONTROLLING THE WALL THICKNESS OF BLOWN GLASS ARTICLES
Ralph H. Olson, Toledo, Ohio, assignor to Owens-Illinois Glass Company, a corporation of Ohio
Filed Aug. 7, 1958, Ser. No. 753,760
6 Claims. (Cl. 49—83)

My invention relates to the control of the distribution of glass throughout the walls of a blown glass article regardless of the method by which the article is produced, namely, whether that article may be produced by the well known Owens suction method, the press and blow method, or the blow and blow method such as practiced in the well known Lynch forming machines.

In the glass forming art as presently practiced the wall thickness of the glass articles is found to be controlled by the shape of the parison, the wall thickness of the parison forming mold, the time interval of contact as between the glass and the mold, and/or the amount of the cooling applied to the walls of the parison shaping mold. In any event the present practice is to control the wall thickness while the parison is being shaped within the parison mold.

It is the intention of this present invention to supply a method whereby the wall thickness of the ultimately blown glass article may be controlled throughout both the circumference and length of the blown article and in addition, such control may be confined to a specific area, either of a localized spot on the wall or an extended circumferential form or pattern extending along the length of the article being blown.

The primary object of this invention is to produce a pattern of distribution in a parison which is not possible with the methods of present practice, for example, to put the glass where it is needed to strengthen the bottle for its particular end use in the trade and to make the ware more functional.

A further object of this invention is control of the strength supplied in the wall structures of such blown articles by an exact and specific control of wall thickness.

A still further object is to provide a method whereby the speed of production may be increased.

A still further object is to control the weight of the articles as blown.

Other objects will be apparent from the following description.

Figures 1, 2:
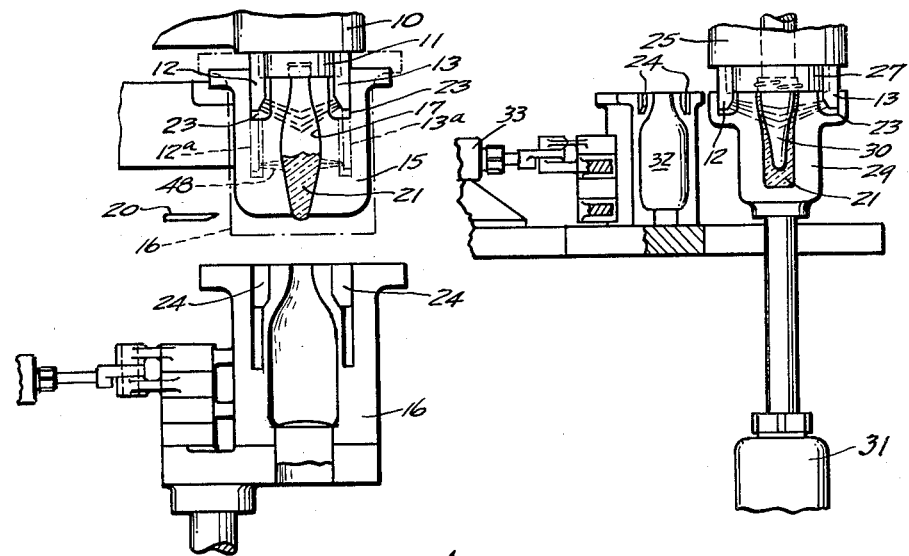
FIG. 1 illustrates the application of the present invention and its mold organization as it will be applied in the well known Owens suction machines such, for example, as is illustrated in patent to La France, No. 1,185,687, dated June 6, 1916.
FIG. 2 illustrates the application of the present invention to a molding machine of the press and blow type wherein the parison is stripped from the blank mold and transferred to a blowing mold.

Referring to the drawings and in particular to FIG. 1, 10 illustrates a mold head carrying a neck forming mold 11 and having a pair of mold centering pins 12 and 13 extending downwardly from and carried by the head 10.

These centering pins not only serve as cooling nozzles but also as a means for causing an alignment as between the neck mold and the cooperating blank mold 15 and blow mold 16.

In the operation of the usual Owens suction machine the parison mold 15 is dipped into a pot of molten glass and through the application of a vacuum to the cavity 17 of the parison mold 15, molten glass is drawn into the cavity and given a preliminary or parison shape. With the filling of this parison mold, the mold lifts from the pot of glass and a cut-off knife 20 will sever the charge in the mold from the glass in the pot, thus completing the formation of a parison 21.

During this parison formation the molds are rotating in a horizontal plane and as they pass beyond the glass gathering pot, the parison mold 15 is opened, exposing the parison to the room atmosphere and at the same time permitting a cooling medium from the nozzles 12 and 13 to be applied to a given portion of the outer surface areas of the parison. During the application of the cooling medium, air may be supplied internally of the parison to form an elongated bubble therein and assist in thinning the wall thickness of the article as finally blown. This puffing of a parison in the open air is common practice in the Owens suction type machine and may be carried out by the mechanism disclosed in the previously mentioned La France patent.

As the machine continues to rotate and the parison molds reach the completion of their opening movement, the blow molds 16 move upwardly into contact with the neck mold 11 and are closed about the parison 21. The combination centering pins and nozzles 12 and 13 are alternately enclosed within cavities 23 and 24 formed respectively in the blank and blow molds 15 and 16.

From the foregoing it should be apparent that one form of control of the application of a cooling medium to the outer surface areas of a parison may be obtained merely by the opening and closing movements of the blank and blow molds respectively, that is, as the halves of the blank mold 15 begin to move or open away from each other, air from the nozzles 12 and 13, which may be continuously energized with air, may begin to impinge upon the outer surface areas of the parison which become gradually exposed by the opening of the parison mold. As the mold continues to open, the area of application of the cooling media gradually expands until a total encompassment of the circumference of the parison will obtain and such encompassment shall or will be within a desired and defined vertical area of the vertical length of the parison.

In order to apply the cooling medium along various lengths of the surface area of the parison, the angle of the air streams from the nozzle may be increased or decreased or the length of the nozzles may be changed to accommodate such desire. Thus in accordance with the immediately preceding statements the degree of cooling will be at a maximum on the seam lines of the split molds, i.e., either or both the blank and blow molds, and will be decreasing in both directions therefrom through the circumference of the parison and will be only in a vertically defined area in accordance with the nozzle structures.

In the formation of parisons by the well known press and blow method there may also be provided a head 25, a neck mold 27 and the same type of mold centering pins or nozzles 12 and 13 as utilized in the Owens machine. In this press and blow method the blank or parison mold 29 is charged with a gob of molten glass and moved up into contact with the neck mold as shown in FIG. 2 and the plunger 30 projected into the molten glass, displacing same into the neck mold and shaping the parison in the parison mold. Thereafter the blank mold 29 is lowered, by means of a cylinder 31, leaving the parison suspended from the neck mold 27 and in a position so that air from the nozzles 12 and 13 will be impinged upon and around certain specific portions of the surface area of said parison and in a predetermined pattern. As the parison mold 29 recedes, exposing the total parison, the neck mold acts to transfer or move the parison to the blow molds 32. The blow molds are arranged to be closed by an air cylinder 33 or other means, about the parison 21 and nozzles 12 and 13, thereby preventing any further application of air upon the outer surface areas of the parison 21.

Thus in this second mechanism it is also possible to control the application of the cooling medium by the opening and closing of the respective blank and blow molds and while the parison is in motion. It is contemplated that the timing mechanisms usually provided in any of these bottle forming and blowing machines will be utilized to control the time and duration of the application of the cooling media to the surface areas of a formed parison regardless of the form of machine producing same. However, it should be obvious that such timing should and must necessarily fall within the period beginning with the initiation of the opening of the blank mold away from the parison to the completion of the closing of a blow mold about the parison.

Figure 3:
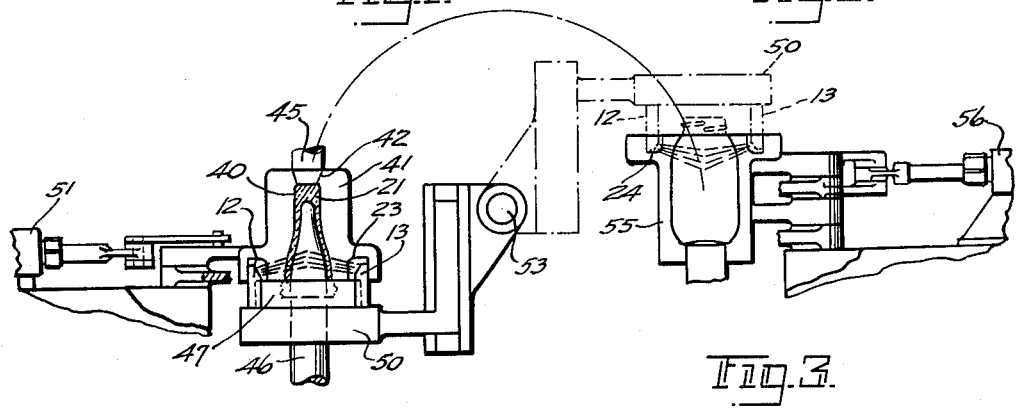
FIG. 3 illustrates the application of the present invention to a machine such as the well known "I. S." machine wherein the parison is released from a parison forming mold and transferred through a vertical plane to a blowing mold.

Further illustration of the application of this contemplated method is disclosed in FIG. 3 wherein there is diagrammatically illustrated the formation of a parison on the well known "I.S." machine through the utilization of a press and blow method on such machine. In this particular instance a gob of molten glass is dropped into the cavity 40 of the inverted blank mold 41 through an opening 42 in the top of this mold. Subsequently a mold closing member 45 is positioned to close the mold opening 42 and a plunger 46 is moved upwardly into the mold cavity 40, displacing the molten glass in the cavity and into the neck mold 47 to thereby form a parison 21.

The neck mold 47 and the parison mold 41 cooperate with a transfer head 50 which carries a pair of mold centering pins or nozzles 12 and 13 about which the neck mold 47 and the parison mold 41 center and move into alignment with each other. The blank mold may be opened and closed by any desired means as, for example, by an air cylinder 51.

With the completion of the formation of the parison, the blank mold 41 will be opened away from the parison, gradually exposing it to a cooling medium supplied by the nozzles 12 and 13. Immediately upon the parison molds 41 being clear of the head 50, this head is swung about a fulcrum 53, bringing the parison to the blowing mold 55 where it is enclosed by the closing of the molds through a cylinder 56. The blowing molds 55 close about the nozzles 12 and 13, thus excluding any further application of a cooling medium. Therefore it is apparent that in this machine as in the others, the application of the cooling medium to the surface areas of a parison must occur between that period at which the initiation of the opening of the blank mold occurs and the completion of the closing of the blow mold about the parison.

It should be apparent that in all of these machines the parison undergoes relative movement during the period of the transfer, from the parison mold to the blow mold and that the cooling medium is being applied to the parison during such transfer. Also it should be apparent that in any of these machines the parison may be puffed or have an elongated bubble formed therein during the application of the cooling medium to its outer surface areas. By puffing the parison or blank at such time the elongation of the parison will be effected by the stretching or movement of the glass in the parison which is below the area of cooling. As previously stated herein, the area of cooling may be at any desired point and of any desired length along the length of the parison.

In addition, the cooling may also be effected at more than one point or area along the length of the parison as is indicated by the dotted lines at 48 on FIG. 1, merely by extending the length of the nozzles as at 12ª and 13ª. In the use of this invention in the Owens process, it is contemplated that the bubble may be blown to the extent that the center core of hot glass is almost completely blown out leaving a hollow parison.

Figures 4, 5:
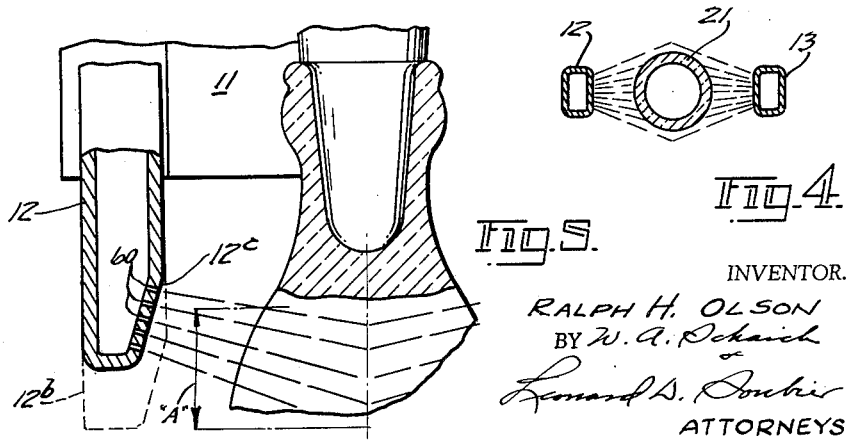
FIG. 4 is a diagrammatic view illustrating the application of a cooling media from a pair of opposed nozzles to the circumferential areas of a parison.
FIG. 5 is an enlarged sectional elevation illustrating the application of the cooling media to the longitudinal surface areas of a shaped parison.

Referring specifically to FIG. 4, which is a diagrammatic view illustrating the impingement of the cooling media upon the outer surface areas of the parison 21, it will be noted that the nozzles 12 and 13 are in direct opposition to each other. However, it is within the purview of this present invention that these nozzles may be otherwise spaced circumferentially of the parison. FIG. 4 is highly illustrative of the results of the impingement of a series of air streams emanating from the nozzles 12 and 13 and indicating that more than one orificial opening may be supplied in the surface areas of the nozzles which are directly opposite to the surfaces of the parison. Thus with a desired number of orificial openings a total encompassment of the surface area of the parison may be accomplished within a defined vertical length of the area. For example, in FIG. 5 a series of openings 60 in the face 12ᶜ of a nozzle 12 are juxtaposed over each other, thus indicating that the vertical length of the area "A" impinged may be controlled by the number of openings 60 supplied in the nozzle.

In addition it is contemplated that the location of the nozzles 12 and 13 may be adjusted vertically as indicated by the dotted lines 12ᵇ in FIG. 5 in order that the area of impingement of the cooling media may be moved to any desired position along the length of the parison. Thus with the adjustment of the nozzle vertically together with the increase or decrease in the number of the orificial openings 60, any desired amount of the vertical length of the parison may be brought under impingement by the cooling media. Further, the arrangement of the orifices 60 may be such that a spot area of cooling may be applied to the parison in order to provide control of distribution of the glass in the container wall and at that one spot.

Modifications may be resorted to within the spirit and scope of my invention.

I claim:

1. In a method of controlling the distribution of glass in the walls of blown glass articles wherein molten glass is formed into a parison within a parison forming mold by the application of a differential pressure thereto, said parison being gradually and progressively exposed to the atmosphere by disengaging said parison mold therefrom, transferring said parison to a blow mold and discontinuing said exposure by concurrently enclosing said parison in said blow mold, said method including the steps of directly applying to a surface of an exposed parison a cooling medium by spraying coolant onto the parison from spaced points that are diametrically opposed and fixed with relation to the parison and in a pattern including a total circumferential encompassment of said parison and to a defined vertically extending surface area of said parison, said application of coolant commencing at the time of exposure of the parison and continuing concomitantly with transfer movement of said parison, whereby said cooling is continuous through a major portion of the total exposure of said parison, enclosing said cooled parison in a blow mold and expanding same therein.

2. In a method of controlling the distribution of glass in the walls of blown glass articles wherein molten glass is formed into a parison within a parison forming mold by the application of a differential pressure thereto, said mold being then disengaged from said parison to expose same to the atmosphere and moving said parison to a position for concurrently enclosing it in a blowing mold, said method including the steps of directing pressurized application of a cooling medium from diametrically exposed points fixed in relation to the parison and radially applied in a pattern which includes a total circumferential encompassment of said parison in a vertically defined surface area thereof, said cooling being applied to the parison at the time of exposure and continuing while the parison is undergoing uninterrupted, continuous transfer to said blow mold, the degree of effectiveness of said cooling being regulable between a maximum at a point on a center line drawn between the opposed points of application and an equalization thereof through the circumferential surface areas under impingement, enclosing said parison in a blow mold and expanding said cooled parison in said blow mold.

3. The method of forming a hollow glass article having controlled distribution of glass in the walls thereof comprising, forming a charge of molten glass into a hollow parison shape in a closed parison mold, opening said parison mold to expose the parison for transfer to a final forming mold, applying a cooling medium to said parison at the time of exposure at its place of formation in a pattern which includes a total circumferential encompassment of a vertically defined surface area of the parison, the application of said pattern of cooling medium being radially directed onto the parison from oppositely disposed points in relation to the latter, transferring said parison to the final forming mold, said application of coolant being continued concomitantly with said transfer and the coolant pattern being retained stationary with respect to the parison at all times, enclosing the transferred parison in the final mold, and forming the enclosed parison to shape in said final mold.

4. A method of controlling the distribution of glass in the walls of blown glass articles wherein a molten glass charge is initially formed into a parison within a parison forming mold by the application of a differential pressure thereto, said mold being then disengaged from said parison to expose same to the atmosphere, said method including the steps of applying a cooling medium radially onto the exposed parison from spaced locations in diametrically opposed relation to the parison in a pattern which includes a total circumferential encompassment of said parison in a vertically defined surface area thereof, the degree of said cooling being maximum at the mold seam lines and decreasing in both directions from the vertical seam lines through the circumference of said parison at the area of application thereof, transferring the parison to a blowing mold by continuous, uninterrupted transferring movement, continuing the application of said cooling medium into the said transfer interval, the coolant pattern being maintained such that it is in a fixed relationship with respect to said parison at all times, and enclosing and expanding said cooled parison in the blow mold.

5. The method of forming blown glass articles having controlled distribution of glass in the walls thereof comprising forming a charge of molten glass into a parison within a closed parison forming mold by the application of a differential pressure thereto, opening said mold to disengage it from said parison and thereby expose same to the atmosphere, applying a cooling medium to the exposed parison at its place of formation through a radially directed, spaced, diametrically opposed applicator directing the coolant onto the exposed parison in a pattern which includes a total circumferential encompassment of said parison in a vertically defined surface area thereof, transferring the parison to a blow mold by continuous, uninterrupted relative movement between it and the blow mold, maintaining said coolant applicator in fixed relationship with respect to the parison while the latter is undergoing transfer to the blow mold, whereby the coolant pattern being applied will remain constant, regulating the time interval of said cooling, and enclosing said cooled parison in the blow mold and expanding it in said blow mold.

6. In a method of controlling the distribution of glass in blown hollow articles wherein a parison is formed in a mold from a heated material in plastic condition by the application of a differential pressure, said parison being disengaged from said parison mold and exposed to the atmosphere for transferring it to a blow mold, said method including transferring the parison from the parison mold to the blow mold, applying a cooling medium to said parison at the time of parison exposure from diametrically opposite sides of said parison in a circumferentially encompassing pattern extending over a selected vertically defined external surface area of said parison, said application being concomitant with said transfer manipulation, and enclosing and expanding said cooled parison in said blow mold.

References Cited in the file of this patent

UNITED STATES PATENTS

| | | |
|---|---|---|
| 1,299,482 | La France | Apr. 8, 1919 |
| 1,869,920 | Soubier | Aug. 2, 1932 |
| 1,894,576 | Tremblay | Jan. 17, 1933 |
| 2,336,821 | Wadman | Dec. 14, 1943 |
| 2,336,822 | Wadman | Dec. 14, 1943 |
| 2,398,465 | Samuelson et al. | Apr. 16, 1946 |
| 2,579,628 | Tremblay | Dec. 25, 1951 |